March 3, 1953 P. D. JORY 2,630,052
LAWN EDGE TRIMMER
Filed April 1, 1949 2 SHEETS—SHEET 2
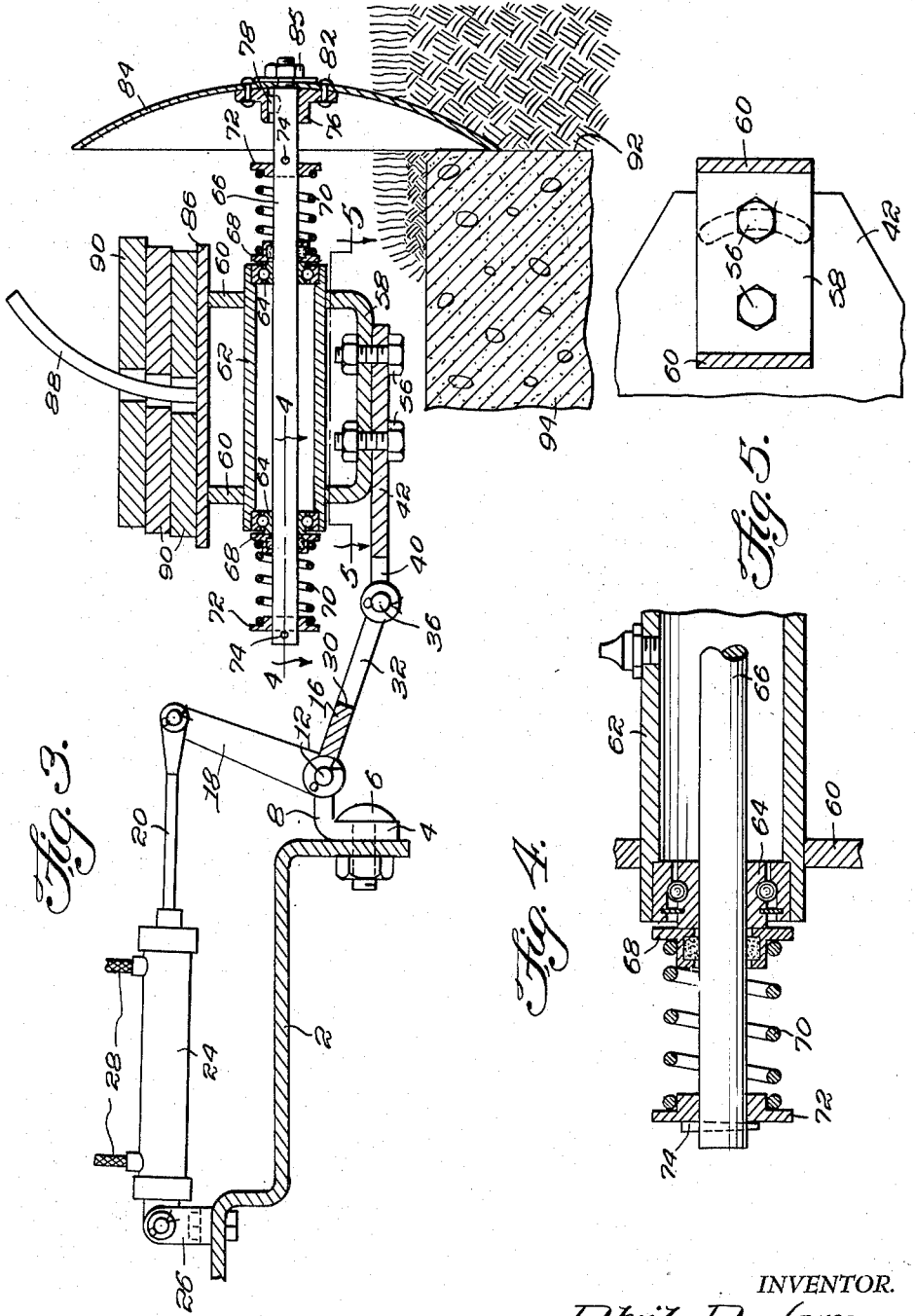
INVENTOR.
Phil D. Jory,
BY Victor J. Evans & Co.
ATTORNEYS Patented Mar. 3, 1953

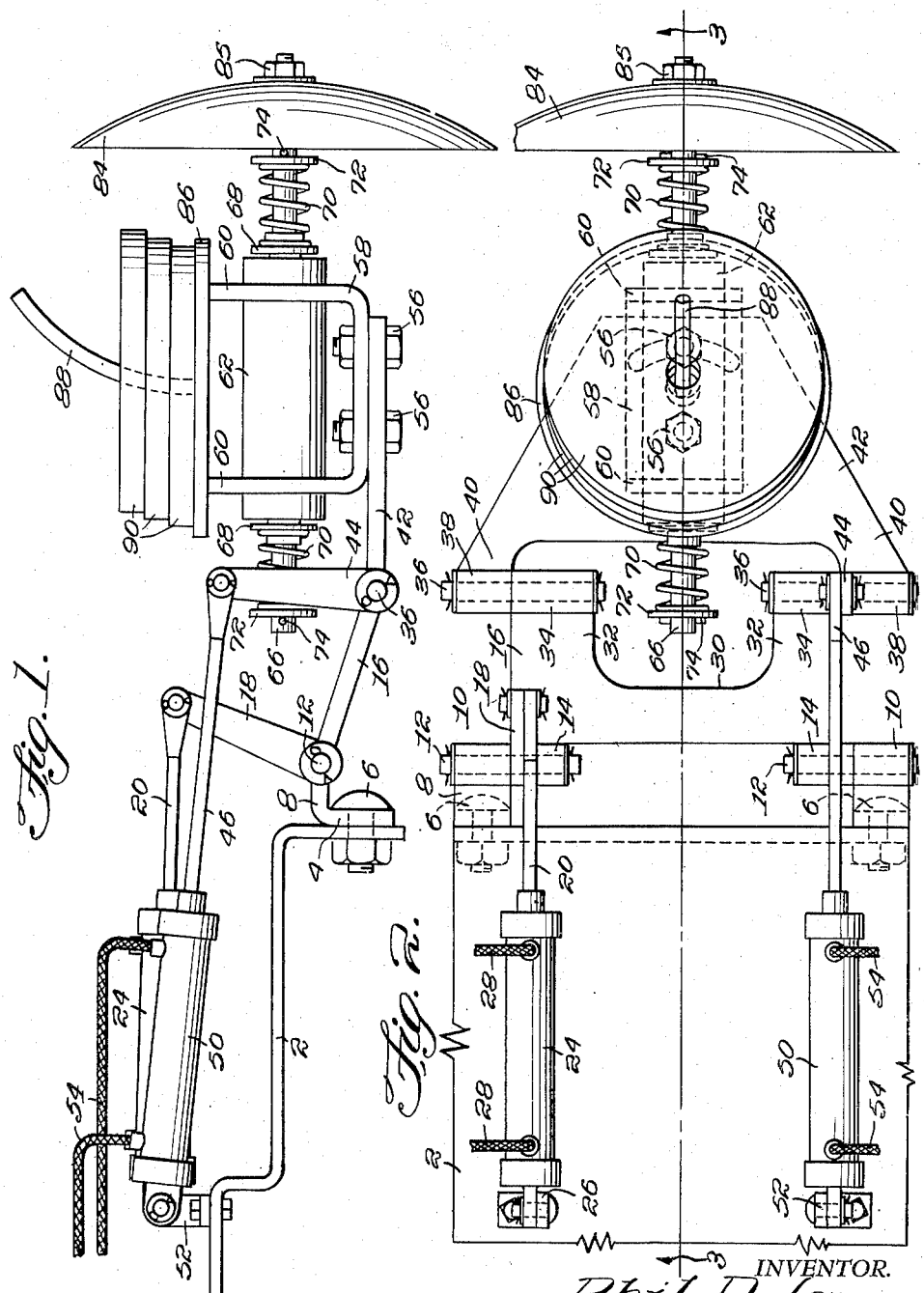

2,630,052

UNITED STATES PATENT OFFICE 2,630,052

LAWN EDGE TRIMMER

Phil D. Jory, Brunswick, Ga.

Application April 1, 1949, Serial No. 84,912

2 Claims. (Cl. 97—227)

My present invention relates to an improved lawn edge trimmer, of the rotary disk cutter type designed especially for use in trimming the edges of lawns and parking strips where they abut sidewalks, curbs and the like.

The trimmer of my invention is especially adapted for use with and for mounting on a self-powered vehicle, tractor, or mower so that as the machine is driven along the edge to be trimmed, the cutter will bear against the curb or walk edge and the grass and overhanging sod may be quickly and easily trimmed.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is a front elevational view of the trimmer and supporting structure according to my invention.

Fig. 2 is a top plan view thereof.

Fig. 3 is a sectional view taken at line 3—3 of Fig. 2.

Figs. 4 and 5 are sectional views at the indicated lines of Fig. 3.

Referring now to the drawings I have illustrated the present preferred embodiment of my invention as adapted for attachment to a bracket plate 2 which may be secured to any suitable part of a vehicle, not shown.

A bar 4 is secured to the plate by bolts 6 and the flange 8 on the bar is curled and serves as a bearing 10 for pins 12 in bearings 14 of the plate 16. A lever arm 18 on the bearing ring 14 is connected by link 20 to the piston of hydraulic cylinder 24 mounted by means of bracket 26 on plate 2, and pipes 28 provide for fluid under pressure to actuate the piston to pivot the plate 16.

This plate 16 has a cut out 30 forming legs 32 and the ends of the legs are curled to form bearings 34 for pins 36, and on these pins are also bearings 38 on the arms 40 of plate or yoke 42. A lever arm 44 on the bearing ring 38 has a link 46 connected to the piston in cylinder 50 mounted by bracket 52 on plate 2, the pipes 54 provide fluid under pressure to actuate the piston and pivot plate 42. The plates 16 and 42 may, of course, be actuated separately or simultaneously by suitable control means, not shown.

On the plate 42 I attach by bolts 56 a U-frame 58, the legs 60 of which are bored to receive the cylinder 62. The ends of this cylinder are closed by bearings 64 for shaft 66 and the collars 68 free on the shaft confine the inner ends of coiled springs 70, outwardly confined by collars 72 fixed on the shaft by pins 74.

On the outer end of the shaft 66 I provide a collar 76 keyed thereon at 78, and on the annular flange 80 of this collar I attach by means of bolts 82 a concave cutter disk 84, secured by nut 85 on shaft 66.

On the upper ends of legs 60 of U-frame 58 I secure a cap plate 86 having a curved spindle 88 to receive and retain the centrally bored weight disks 90.

Obviously the cutter disk travels in the usual manner with the edge thereof bearing against the inner face 92 of a walk or curb 94 to trim the edge of the lawn abutting thereagainst.

The running position of the cutter may be varied and set by means of the cylinder 24, and emerging elevation of the cutter so as to avoid an obstacle may be accomplished by the cylinder 50.

Angular adjustment of the U-frame 58 may be had through the use of an arcuate slot for the outer bolt 56 and the spring mounting of the shaft 66 will allow movement of the cutter to meet variations in the curb or walk.

Having thus fully described my invention what I claim as new and desire to secure by Letters Patent is:

1. In a lawn edge trimmer, a bracket adapted to be attached to a vehicle, a first and second cylinder supported by said bracket and adapted to be connected to a source of supply of hydraulic fluid, a plate provided with a cut-out defining a pair of spaced legs mounted for pivotal movement with respect to said bracket, an arm extending from said plate and operatively connected to one of said cylinders, a yoke pivotally connected to the legs of said plate, a lever extending upwardly from said yoke and operatively connected to the other of said cylinders, a frame supported on said yoke and secured thereto, a cylinder supported by said frame, a shaft extending longitudinally through said last named cylinder, a pair of coil springs circumposed on said shaft, a collar keyed to the outer end of said shaft and provided with an annular flange, a concave cutter disc secured to said flange, and a cap plate secured to said frame.

2. The apparatus as described in claim 1, and further including a curved spindle extending from said cap plate, and a plurality of weighted discs each provided with a central opening for the projection therethrough of said spindle.

PHIL D. JORY.

REFERENCES CITED

The following references are of record in the file of this patent:

UNITED STATES PATENTS

| Number | Name | Date |
|---|---|---|
| 797,289 | Kennedy et al. | Aug. 15, 1905 |
| 1,505,201 | Johnson | Aug. 19, 1924 |
| 2,125,134 | Thompson | July 26, 1938 |
| 2,193,157 | Ayo | Mar. 12, 1940 |
| 2,324,065 | Coffing | July 13, 1943 |
| 2,335,510 | Hansen | Nov. 30, 1943 |
| 2,427,968 | Hoover | Sept. 23, 1947 |
| 2,437,581 | Wray | Mar. 9, 1948 |